United States Patent [19]
Weiser et al.

[11] Patent Number: 6,133,330
[45] Date of Patent: Oct. 17, 2000

[54] AROMATIC POLYIMIDE FOAM

[75] Inventors: Erik S. Weiser, Newport News; Terry L. St. Clair, Poquoson, both of Va.; Yoshiaki Echigo; Hisayasu Kaneshiro, both of Kyoto, Japan

[73] Assignee: The United States of America as represented by the Administrator of the National Aeronautics and Space Administration, Washington, D.C.

[21] Appl. No.: 09/337,475

[22] Filed: May 21, 1999

Related U.S. Application Data

[60] Provisional application No. 60/087,272, May 29, 1998.

[51] Int. Cl.[7] .................................. C08J 9/00; C08J 9/30
[52] U.S. Cl. ......................... 521/54; 521/183; 521/185; 521/189; 523/219
[58] Field of Search .............................. 521/54, 183, 184, 521/185, 189; 523/219

[56] References Cited

U.S. PATENT DOCUMENTS

| | | | |
|---|---|---|---|
| 3,441,532 | 4/1969 | Victorious . | |
| 4,535,115 | 8/1985 | Bakshie al. . | |
| 4,670,478 | 6/1987 | Shulman et al. . | |
| 4,900,261 | 2/1990 | Lee | 521/184 |
| 5,077,318 | 12/1991 | Barringer et al. | 521/184 |
| 5,122,546 | 6/1992 | Lee | 521/184 |
| 5,298,531 | 3/1994 | Ishikura et al. | 521/184 |

FOREIGN PATENT DOCUMENTS

| | | |
|---|---|---|
| 0 610 929 A | 8/1994 | European Pat. Off. . |
| 2 768 434 A1 | 3/1999 | France . |
| WO 99 36462 A | 7/1999 | WIPO . |

OTHER PUBLICATIONS

WPI/Derwent 1977–243843 Abstract.

*Primary Examiner*—Morton Foelak

[57] ABSTRACT

A mechanically undensified aromatic polyimide foam is made from an aromatic polyimide precursor solid residuum and has the following combination of properties: a density according to ASTM D-3574A of about 0.5 pounds/ft$^3$ to about 20 pounds/ft$^3$; a compression strength according to ASTM D-3574C of about 1.5 psi to about 1500 psi; and a limiting oxygen index according to ASTM D-2863 of about 35% oxygen to about 75% oxygen at atmospheric pressure. The aromatic polyimide foam has no appreciable solid inorganic contaminants which are residues of inorganic blowing agents. The aromatic polyimide which constitutes the aromatic polyimide foam has a glass transition temperature (Tg) by differential scanning calorimetry of about 235° C. to about 400° C.; and a thermal stability of 0 to about 1% weight loss at 204° C. as determined by thermogravimetric analysis (TGA).

The aromatic polyimide foam has utility as foam insulation and as structural foam, for example, for aeronautical, aerospace and maritime applications.

20 Claims, 3 Drawing Sheets

AROMATIC POLYIMIDE FOAM

CROSS REFERENCE TO RELATED APPLICATION

This application claims the benefit of U.S. provisional application Ser. No. 60/087,272, filed May 29, 1998.

ORIGIN OF THE INVENTION

The invention described herein was jointly made by employees of the United States Government and employees of Unitka Ltd. In the performance of work under NASA MOA, SAA #385.

BACKGROUND OF THE INVENTION

1. Field of the Invention

The present invention relates generally to polyimides. It relates in particular to an aromatic polyimide foam, which is effectively utilized as foam insulation and as structural foam, especially in aeronautical and aerospace applications.

2. Description of the Related Art

High performance polyimides are presently used in the aerospace industry, for example, in joining metals to metals, or metals to composite structures. In addition, polyimides are rapidly finding new uses as foam insulation in cryogenic applications, and as structural foam having increased structural stiffness without large weight increases, in aerospace structures.

Polyimide foam materials have a number of beneficial attributes for next generation space vehicles, such as high temperature and solvent resistance, flame resistance, low smoke generation, high modulus and chemical and hot water resistance. Another area for polyimide foams is in the manufacture of low density insulation for thermal and acoustic applications, and reinforcement for the maritime industry.

Figure 1:
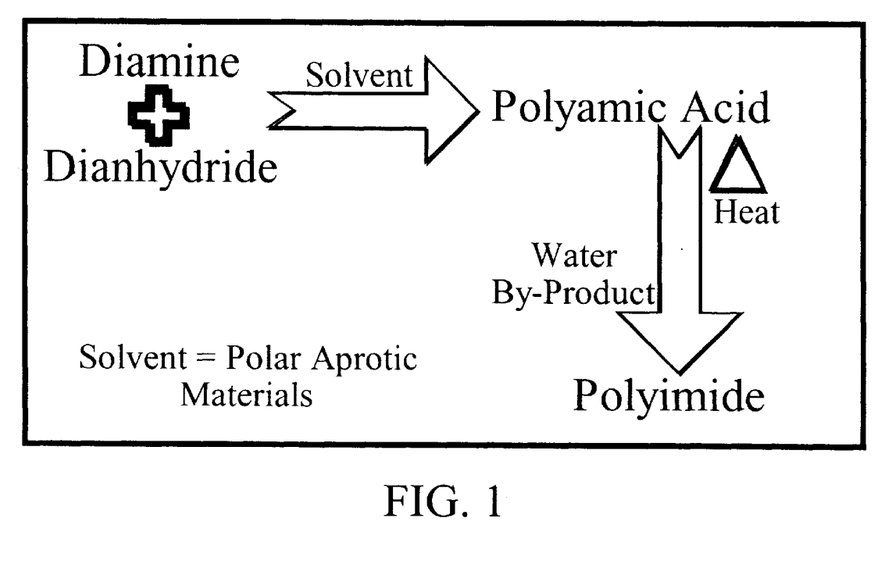
FIG. 1 is a process schematic representing a standard process for preparing polyimides.
Figure 2:
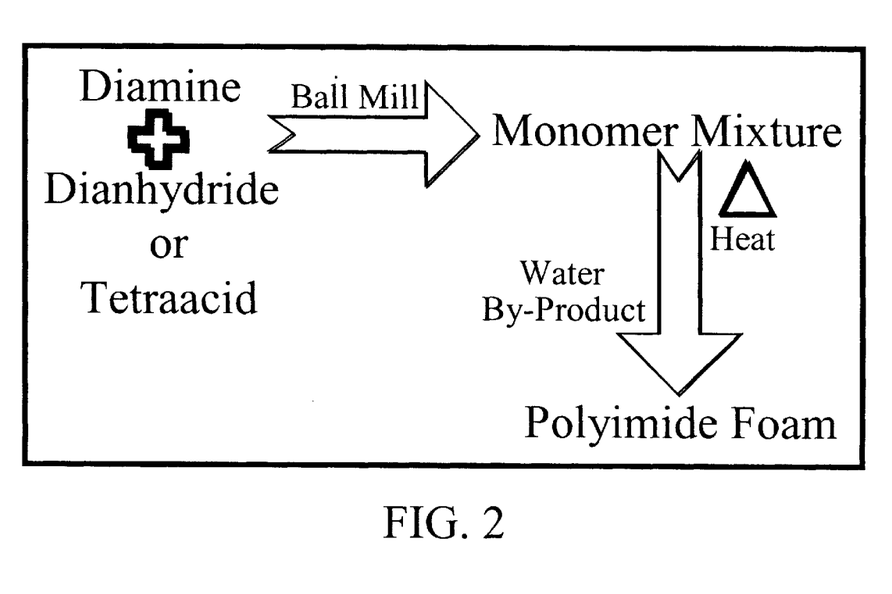
FIG. 2 is a process schematic representing the related art preparation of polyimide foam by ball milling.

U.S. Pat. Nos. 5,147,966 and 5,478,916 disclose polyimides that can be melt processed into various useful forms such as coatings, adhesives, composite matrix resins and films. These polyimides are prepared from various diamines and dianhydrides in various solvents. The use of monoanhydrides as endcapping agents is also disclosed in these patents to control the molecular weight of the polymers and, in turn, to make them easier to process in molten form. The use of ethers to make polyimide adhesives was disclosed in U.S. Pat. No. 4,065,345, which demonstrates another method to produce polyimide resin systems. FIG. 1 shows the method employed by these patents to produce polyimides. of dianhydrides or tetraacids being dissolved by a diamine upon melting. The ensuing reaction produces water and thus foams the molten material. FIG. 2 illustrates the process to make foam by this patent.

Figure 3:
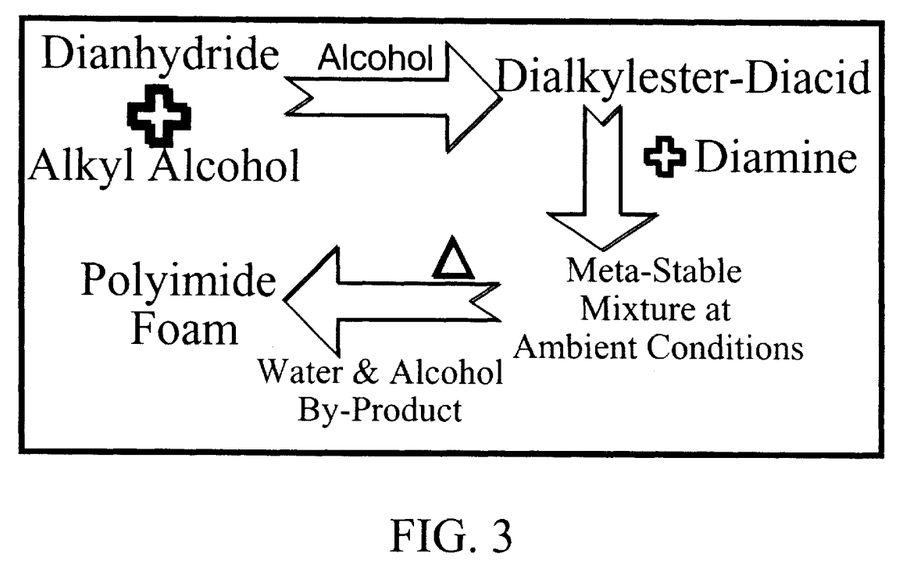
FIG. 3 is a process schematic representing a state-of-the-art process for preparing polyinide foam.
Figure 4:
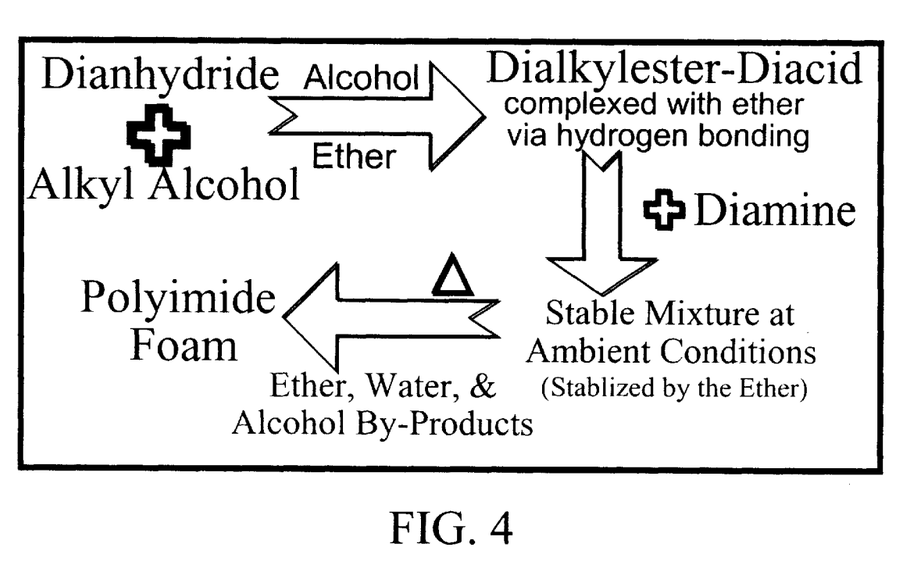
FIG. 4 is a process schematic representing a process for preparing aromatic polyimide foam according to the present invention.

The state-of-the-art technology for making polyimide foams as disclosed in U.S. Pat. Nos. 5,298,531, 5,122,546, 5,077,318, and 4,900,761 utilizes solutions of diamines and dianhydride derivatives in a low molecular weight alkyl alcohol solvent. Polyimide precursor solutions and powders therefrom are then processed into foams through the expulsion of water and alcohol (R—OH) during the thermal imidization process. In these cases the solvent reacts initially with the dianhydride to form a covalently bonded specie referred to as a dialkylester-diacid (DADA) before the aromatic diamine is added. The aforementioned patents also illustrate the use of blowing agents to aid in the foaming process. The blowing agents utilized by these patents serve as a separate entity and usually result in a foam that has residual blowing agent within its cell walls. FIG. 3 demonstrates the state-of-the-art in this foam preparation technology.

Unfortunately, foams prepared by these methods are not available in a wide range of densities with the desired combination of excellent mechanical properties (e.g., compression strength) and non-flammability (e.g., as measured by limiting oxygen index, which characterizes the resistance of a material to instantaneous combustion in an oxygen-rich environment). Moreover, many of the foams of the related art contain a substantial amount of solid inorganic contaminants, which are present as a result of the blowing processes employed to make the foams. Such contamination is undesirable in a number of applications.

SUMMARY OF THE INVENTION

It is accordingly a primary object of the present invention to provide a foam having a combination of properties heretofore unobtainable in the art. It is another primary object of the present invention to provide an aromatic polyimide foam having a wide range of available densities with the desired combination of excellent mechanical properties and non-flammability, at the same time being free of solid inorganic contaminants which result from standard foam blowing processes.

These objects and their attending benefits are achieved, and the disadvantages of the art are avoided, by the present invention, which is a mechanically undensified foam made of an aromatic polyimide and having the combination of a density according to ASTM D-3574A of about 0.5 pounds/ft$^3$ to about 20 pounds/ft$^3$;

a compression strength according to ASTM D-3574 (C) of about 1.5 psi to about 1500 psi;

a limiting oxygen index according to ASTM D-2863 of about 35% oxygen to about 75% oxygen at atmospheric pressure; and no appreciable solid inorganic contaminants which are residues of inorganic blowing agents.

The aromatic polyimide which constitutes the foam of the present invention has a glass transition temperature (Tg) by differential scanning calorimetry of about 235° C. to about 400° C., and a thermal stability of from 0 to about 1% weight loss at 204° C. by thermogravimetric analyzer (TGA). These thermal properties—which are attributable to the aromatic polyimide—along with the wide range of densities, excellent compression strength, non-flammability, and freedom from solid inorganic contaminants—which are characteristic of the foam—provide a combination of properties which makes the present invention especially useful as an insulating material for a variety of applications, as well as a structural foam, e.g., for aeronautical and aerospace applications, as well as maritime applications.

BRIEF DESCRIPTION OF THE DRAWINGS

For a more complete understanding of the present invention, including its primary objects and attending benefits, reference should be made to the Description of the Preferred Embodiments, which is set forth below. This description should be read together with the accompanying Drawings, wherein.

DESCRIPTION OF THE PREFERRED EMBODIMENTS

Technical terms used in the present application are presented below:

(1) Aromatic Polyimide

The term aromatic polyimide means a thermally-stable organic polymer wherein 60 to 100 mol %, preferably 70 mol % or more, and more preferably 80 mol % or more of the repeating units of the polymer chain thereof have the structure represented by the following formula (I):

(I)

wherein R is a tetravalent aromatic radical having 1 to 5 benzenoid-unsaturated rings of 6 carbon atoms, the four carbonyl groups being directly bonded to different carbon atoms in a benzene ring of the R radical, each pair of carbonyl groups being bonded to adjacent carbon atoms in the benzene ring of the R radical; and R' is a divalent aromatic radical having 1 to 5 benzenoid-unsaturated rings of 6 carbon atoms, the amino groups being directly bonded to different carbon atoms in a benzene ring of the R' radical.

(2) Aromatic polyimide precursor solid residuum

This refers to an organic substance in the form of powder, flake, or friable balloons—which becomes a polyimide by thermal imidization.

(3) Flake

The term flake means a blend of a polyimide precursor solid residuum with other polymers such as thermosetting or thermoplastic polymers. The thermosetting polymers include epoxy, phenolic, and thermosetting polyimide. The thermoplastic polymers include thermoplastic polyimide and polyamide imide. These polymers are blended with the polyimide precursor solid residuum in any ratio to yield the flake.

(4) Friable balloons

The term friable balloons means a particular form of the polyimide precursor solid residuum which has an apparent density of less than about 10 pounds/ft³. Preferably, the shape of the friable balloons is spherical.

(5) Apparent density

Apparent density is estimated, for example, according to ASTM D-3574A.

(6) Compression strength

Compression strength is a mechanical property, which is estimated, for example, according to ASTM D-3574C.

(7) Limiting oxygen index

Limiting oxygen index, which is a measure of flammability, characterizes the resistance of a material to instantaneous combustion in an oxygen-rich environment. This is measured by ASTM D-2863.

(8) Glass transition temperature (Tg)

This thermal property is determined from the inflection point associated with a change in heat capacity at constant pressure, employing differential scanning calorimetry (DSC).

(9) Thermal stability

This thermal property is determined by means of a thermogravimetric analyzer (TGA)

(10) An approximately equimolar mixture.

This means a mixture of two components wherein the mol ratio is within the range of 0.95 to 1.05.

(11) The following abbreviations used herein are understood to mean:

ODPA=4,4'-oxydiphthalic anhydride

ODP-TA=4,4"oxydiphthalic acid (a tetraacid)

BPDA=3,3',4,4'-biphenyl tetracarboxylic dianhydride

BTDA=3,3'4,4'-benzophenone tetracarboxylic dianhydride

DSDA=3,3'4,4'-diphenylsulfone tetracarboxylic dianhydride

PMDA=pyromellitic dianhydride

BPADA=2,2-bis(4-(3,4-carboxyphenyl))propane diahydride 3,4' ODA=3,4'-oxydianiline 4,4' ODA=4,4'-oxydianiline APB=1,3-bis(3-aminophenoxy)benzene BPB=1,3-bis(4-aminophenoxy)benzene m-PDA=m-phenylenediamine p-PDA=p-phenylenediamine 3,3'DDS=3,3'-diamninodiphenylsulfone 4,4'DDS=4,4'-diaminodiphenylsulfone 4,4 BAPS=bis(4-(4-aminophenoxy)phenyl)sulfone 4,3 BAPS=bis(4-(3-aminophenoxy)phenyl)sulfone 3 BAPB=4,4'-bis(3-aminophenoxy)biphenyl 4 BAPB=4,4'-bis(4-aminophenoxy)biphenyl BAPP=2,2'-bis(4-(4-aninophenoxy)phenyl)propane Referring now to the present invention, the foam of the present invention is composed of any aromatic polyimide, and preferably an aromatic polyimide having repeating units represented by formula (I) above. Especially beneficial aromatic polyinide foams are provided when the aromatic polyimide having repeating units represented by formula (I) above is prepared by reacting at least one derivative of dianhydride selected from the group consisting of ODPA; BPDA, BTDA; DSDA; PMDA and BPADA with at least one derivative of a diamine selected from the group consisting of 3,4' ODA; 4,4' ODA, APB; BPB; m-PDA; p-PDA; 3,3'DDS; 4,4' DDS; 4,4 BAPS; 4,3 BAPS; 3 BAPB; 4 BAPB and BAPP. Under these conditions, when the foam has a density between about 0.5 and about 5 pounds/ft³, the compression strength is between about 1.5 psi and about 120 psi at 10% deflection, and the limiting oxygen index is between about 35% oxygen and about 50% oxygen. Under the same conditions, when the foam has a density between about 5 and about 20 pounds/ft³, the compression strength is between about 120 psi and about 620 psi at 10% deflection, and the limiting oxygen index is between about 50% oxygen and about 75% oxygen. Particularly advantageous aromatic polyimide foams are provided when:

(a) the aromatic polyimide is prepared by reacting ODPA with 3,4' ODA, and the density of the foam is between about 0.5 and about 20 pounds/ft³;

(b) the aromatic polyimide is prepared by reacting BTDA with 4,4' ODA, and the density of the foam is about 2 pounds/ft³; and (c) the aromatic polyimide is prepared by reacting BTDA with 4,4' DDS, and the density of the foam is about 2 pounds/ft³.

Equally beneficial aromatic polyimide foams are provided when the aromatic polyimide having repeating units represented by formula (I) above is an admixture of two or more different polyimides prepared by reacting at least one derivative of a dianhydride selected from the group consisting of ODPA; BPDA; BTDA; DSDA; PMDA and BPADA with at least one derivative of a diamine selected from the group consisting of 3,4' ODA; 4,4' ODA; APB; BPB; m-PDA; p-PDA; 3,3'DDS; 4,4'DDS; 4,4 BAPS; 4,3 BAPS; 3 BAPB; 4 BAPB and BAPP. Also beneficial are foams derived from copolyimides synthesized from the aromatic dianhydride derivatives and the aromatic diamine derivatives listed above.

The present invention also comprehends the provision of integral, composite structures made by employing the instant aromatic polyimide foam to fill receptacles. Particularly desirable as receptacles are containers made up of an array of open cells therein, such as honeycomb structures constituting a contiguous array of hexagonal cells of a reinforced polymeric material. Such cells are filled with the aromatic polyimide foam, and an exceptional integral composite structure is the result.

Another preferred embodiment of the present invention is a foam including the instant aromatic polyimide in intimate association with between about 1 and 50% by weight of a filler, based on total weight of the foam plus filler. Especially preferred fillers are glass microspheres, phenolic microspheres, ground cork, mica, glass fibers, and wollastonite fibers. Outstanding mechanical properties are achieved by this embodiment, in addition to the already desirable combination of available densities, non-flammability, and excellent thermal properties. Especially preferred is an embodiment of this foam wherein the instant aromatic polyimide is in intimate association with glass microspheres in an amount sufficient to provide between about 20 and 35% by weight, based on the total weight of foam plus filler.

Of significance in a number of applications is the fact that aromatic polyimide foams according to the present invention do not possess any appreciable solid inorganic contaminants which are residues of inorganic blowing agents. This fact is understood by the skilled artisan in the light of the following description of a process for preparing aromatic polyimide foams according to the present invention.

Foams according to the present invention are prepared by first providing an aromatic polyimide precursor solid residuum. This residuum is an admixture of an aromatic compound (A), which is an aromatic dianhydride or a derivative of an aromatic dianhydride, and an aromatic compound (B), which is an aromatic diamine or a derivative of an aromatic diamine, plus a complexing agent (C), which is complexed with the admixture by hydrogen bonding, the complexing agent (C) being present in an amount sufficient to provide from about 1 to about 15% by weight, based on the total weight of the polyimide precursor solid residuum. Especially beneficial results are obtained if the polyimide precursor solid residuum is prepared from an admixture comprising an approximately equimolar mixture of an aromatic compound (A) and an aromatic compound (B)

(A)

(B)

wherein n is an integer from 0 to 3, and $R_1$ is hydrogen or an alkyl group, and $R_2$ is a tetravalent aromatic radical having 1 to 5 benzenoid-unsaturated rings of 6 carbon atoms, $R_3$ is a divalent aromatic radical having 1 to 5 benzenoid-unsaturated rings of 6 carbon atoms; plus a complexing agent (C), which is complexed with the admixture by hydrogen bonding and which has a boiling temperature of less than 200° C., the complexing agent (C) being present in an amount sufficient to provide from about 1 to about 15% by weight, based on the total weight of the aromatic polyimide precursor solid residuum, which is formed by heating the complexed admixture to remove excess complexing agent and volatile by-products. Outstanding results are obtained if the aromatic compound (A) and the aromatic compound (B) as specified above are present in the admixture in approximately equimolar amounts. The aromatic polyimide precursor solid residuum is then heated to a temperature between about 100° C. and 200° C. to produce a foam. This foam is then heated to a temperature between about 200° C. and 300° C. to produce a thermally imidized foam, which is then cooled for subsequent utilization. Although not required in the practice of this process, conventional additives may be added to the above described solution or to the resulting polyimide precursor solid residuum if desired. Examples of such additives are surface active agents (SH190,8H193—Toray/Dow Coming silicone; Zonyl FSC—DuPont; L550, L5430—Union Carbide), pigments, fibrous fillers, and the like.

EXAMPLES

The following Examples are illustrative of the present invention and are not intended to limit its scope.

I. Preparation of Polyimide Precursor Solid Residuum 1. 756 g (2.4 mol) of ODPA was dispersed in a mixture of 480 g of TBF and 280 g of MeOH at room temperature. This suspension was treated at 70° C. for 6 hours in order to convert the ODPA into ODPA-DADA complexed with THF by hydrogen bonding. 488 g (2.4 mol) of 3,4'ODA was added to the resulting solution of ODPA-DADA and stirred for 2 hours to yield a homogenous polyimide precursor solution. The resulting polyimide precursor solution had a solids content of 70 wt % and a viscosity of 20 poise at 20° C. The solution was then charged into a stainless-steel vat and treated at 70° C. for 14 hours in order to evaporate the solvent (THF and MeOH). The resulting material was cooled and crushed into a fine powder (2 to 500 μm). (These powders are sieved using a mesh, if needed.) The polyimide precursor solid residuum was then treated for an additional amount of time (0 to 300 minutes) at 80° C. to further reduce the residual solvents to about 1–10 wt % depending on the final foam density desired. Residual amounts of THF were determined by measuring proton NMR spectra of the powders.

2. The procedure of Example 1 was repeated except that 480 g of Glyme was used in replacement of THF.

3. The procedure of Example 1 was repeated except BTDA was used in replacement of ODPA.

4. The procedure of Example 1 was repeated except that BPDA was used in replacement of ODPA.

5. The procedure of Example 1 was repeated except that DSDA was used in replacement of ODPA.

6. The procedure of Example 1 was repeated except that PMDA and 3BAPB were used, in replacement of ODPA and 3,4'ODA, respectively.
7. The procedure of Example 1 was repeated except that BPADA and m-PDA were used, in replacement of ODPA and 3,4'ODA, respectively.
8. The procedure of Example 1 was repeated except that a mixture of 3,4'ODA and p-PDA (mol ratio: 90/10) was used in replacement of 3,4'ODA.
9. The procedure of Example 3 was repeated except that 4,4'ODA was used in replacement of 3,4'ODA.
10. The procedure of Example 2 was repeated except that 4,4'DDS and BTDA were used in replacement of 3,4'ODA and ODPA, respectively.
11. The procedure of Example 3 was repeated except that 4,3BAPS was used in replacement of 3,4'ODA.
12. The procedure of Example 4 was repeated except that a mixture of 3,4'ODA and APB (mol ratio 85/15) was used in replacement of 3,4'ODA.
13. The procedure of Example 1 was repeated except that a mixture of BTDA and NA (5-norbomene-2–3dicarboxylic anhydride) (mol ratio: 2.1/2.0) was used in replacement of ODPA. A mol ratio of BTDA/3,4'ODA was 0.68. This example is employed to show that polyimide foams according to the present invention can be prepared from end-capped or partially end-capped oligomers and polymers.
14. 227 g (1.1 mol) of 3,4' ODA was dissolved in a mixture of 1120 g of THF and 280 g of MeOH at room temperature. To the stirring 3,4'ODA solution, 176 g (0.57 mol) of ODPA was added gradually at 15° C. to yield a homogenous solution. To this solution, 197 g (0.57 mol) of ODPA-tetraacid was added gradually and the mixture was stirred for 24 hr at 30° C. to yield a homogenous precursor solution. Solid contents and viscosity of the resulting solution were 30 wt % and 0.2 poise, respectively. From this solution, polyimide precursor solid residuum was prepared in a similar manner to Example 1. This product was also used to make friable balloons. See Example 18.
15. 336 g (0.78 mol) of 4,4BAPS was dissolved in a mixture of 1120 g of THF and 280 g of MeOH at room temperature. To the stirring 4,4BAPS solution, 125 g (0.39 mol) of BTDA was added gradually at 15° C. over 40 min. The resulting mixture was stirred for 2 hr at 15° C. to yield a homogenous solution. To this solution, 139 g (0.3 mol) of BTDA-tetraacid was added gradually and the mixture was stirred for 24 hr at 30° C. to yield a homogenous precursor solution. Solid contents and viscosity of the resulting solution were 30 wt % and 0.2 poise, respectively. From this solution, polyimide precursor solid residuum was prepared in a similar manner to Example 1. This product was also used to make friable balloons. See Example 19.
16. The procedure of Example 15 was repeated except that a mixture of 4,4'DDS and 3,3'DDS (mol ratio: 80/20) was used in replacement of 4,4BAPS. This product was also used to make friable balloons See Example 20.
17. The procedure of Example 14 was repeated except that a mixture of 3,4'ODA and APB (mol ratio: 85/15); BTDA and BTDA tetraacid are used in replacement of 3,4'ODA, ODPA and ODPA tetraacid respectively. This product was also used to make friable balloons. See Example 21.
18. Polyimide precursor powders obtained by the procedure of Example 14 were further treated at 100° C. to expand the powders without thermal irnidization so that the apparent density of the precursor was decreased without thermal imidization.
19. Polyimide precursors obtained by the procedure of Example 15 were further treated at 140° C. to expand the precursors without thermal imidization so that the apparent density of the precursor was decreased without thermal imidization.
20. Polyimide precursors obtained by the procedure of Example 16 were further treated at 110° C. to expand the precursors without thermal irnidization so that the apparent density of the precursor was decreased without thermal imidization.
21. Polyimide precursors obtained by the procedure of Example 17 were further treated at 130° C. to expand the precursors without thermal imidization so that the apparent density of the precursor was decreased without thermal imidization.
22. Polyimide precursor solid residuum prepared by the process of the above examples was expanded to form foam as follows: 0.5 g of polyimide precursor was charged into a standard glass tube (diameter 16 mm/length 180 mm). The glass tube was placed in an oven set to 140° C. and the material was held up to 15 minutes at this temperature. The hold at 140° C. allowed foaming to occur. Once the hold was complete, the test tube was returned to ambient conditions and the height of the resulting foam was measured.

In Table 1 values of the height are summarized as well as properties of the polyimide precursor solid residuum.

TABLE 1

Properties of Polyimide Precursor Solid Residuum

| Example | PI | Precursor Powder No | Ether Contents (wt %) | Average Particle size (μm) | Apparent Density (pcf) | Expandability (mm) |
| --- | --- | --- | --- | --- | --- | --- |
| A. Standard Powder |
| 1 | ODPA/3,4'ODA | (A) | 2.7 | 155 | 43 | 32 |
|   |   | (B) | 3.5 | 400 | 37 | 60 |
|   |   | (C) | 3.2 | 300 | 37 | 55 |
|   |   | (D) | 2.8 | 200 | 42 | 45 |
|   |   | (E) | 1.9 | 100 | 36 | 17 |
| 2 | ODPA/3,4'ODA | (F) | 6.1 | 140 | 41 | 83 |
| 3 | BTDA/3,4'ODA | (G) | 4.2 | 150 | 37 | 82 |
| 4 | BPDA/3,4'ODA | (H) | 3.9 | 140 | 39 | 80 |
| 5 | DSDA/3,4'ODA | (I) | 4.0 | 160 | 40 | 85 |
| 6 | PMDA/3BAPB | (J) | 3.8 | 150 | 40 | 82 |
| 7 | BPADA/m-PDA | (K) | 4.0 | 150 | 41 | 84 |
| 8 | ODPA/3,4'ODA, | (L) | 3.3 | 120 | 36 | 81 |

TABLE 1-continued

Properties of Polyimide Precursor Solid Residuum

| Example | PI | Precursor Powder No | Ether Contents (wt %) | Average Particle size (μm) | Apparent Density (pcf) | Expandability (mm) |
|---|---|---|---|---|---|---|
|  | p-PDA (9/1) |  |  |  |  |  |
| 9 | BTDA/4,4'ODA | (M) | 4.0 | 80 | 26 | 95 |
|  |  | (N) | 4.3 | 300 | 30 | 105 |
|  |  | (O) | 3.9 | 100 | 27 | 80 |
|  |  | (P) | 3.7 | 50 | 28 | 40 |
|  |  | (Q) | 3.2 | 50 | 25 | 20 |
| 10 | BTDA/4,4'DDS | (R) | 6.4 | 150 | 48 | 84 |
|  |  | (S) | 6.7 | 150 | 49 | 100 |
| 11 | BTDA/4,3BAPS | (T) | 4.6 | 150 | 41 | 81 |
| 12 | BPDA/3,4'ODA, APB (85/15) | (U) | 4.3 | 140 | 36 | 35 |
|  | BPDA/3,4'ODA, APB (85/15) | (V) | 4.7 | 140 | 37 | 70 |
| 13 | BTDA/NA (2.1/2.0)/3,4'ODA | (W) | 3.9 | 150 | 34 | 50 |
| 14 | ODPA/3,4"ODA | (AA) | 10.2 | 200 | 30 | 70 |
|  |  | (BB) | 10.3 | 100 | 29 | 60 |
| 15 | BTDA/4,4BAPS | (CC) | 12.3 | 150 | 22 | 100 |
| 16 | BTDA/4,4'DDS, 3,3'DDS (8/2) | (DD) | 10.5 | 150 | 29 | 100 |
| 17 | BTDA/3,4'ODA, APB (85/15) | (EE) | 12.0 | 140 | 31 | 120 |
| B. Friable Balloons |  |  |  |  |  |  |
| 18 | ODPA/3,4'ODA | (FF) | 7.0 | 300 | 2.4 | 74 |
|  |  | (GG) | 4.5 | 150 | 4.3 | 55 |
| 19 | BTDA/4,4BAPS | (HH) | 9.1 | 400 | 3.7 | 45 |
| 20 | BTDA/4,4'DDS, 3,3'DDS (8/2) | (II) | 7.9 | 400 | 2.6 | 70 |
| 21 | BTDA/3,4'ODA, APB (85/15) | (JJ) | 9.8 | 300 | 3.9 | 40 |

II. Preparation of Neat Foam

Figure 5:
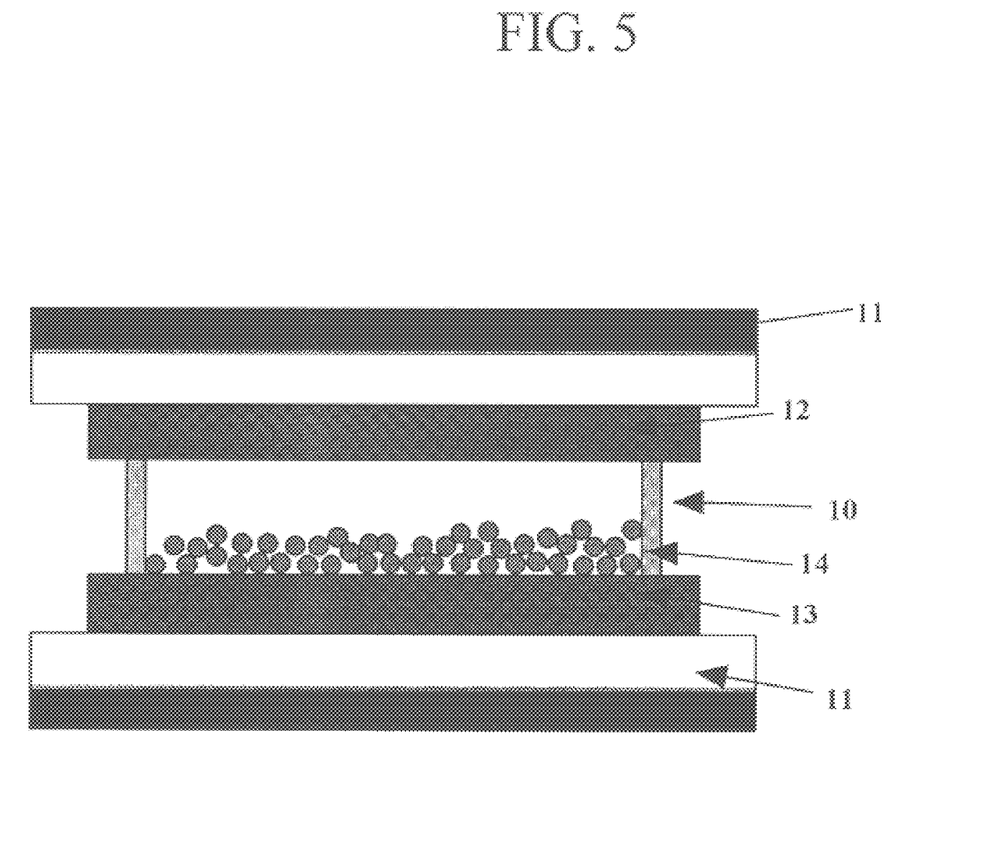
FIG. 5 is a schematic representation of the preparation of aromatic polyimide foam according to the present invention in a standard closed mold.

Referring now to FIG. 5, a standard mold is presented for use in the preparation of foam from the aromatic polyimide precursor solid residuum. The mold includes a mold chamber 10 bounded by upper graphite plate 12 and lower graphite plate 13. Heating of the mold is accomplished by means of heat plates 11 at the top and bottom of the mold. A desired amount of aromatic polyimide precursor solid residuum 14 was charged into mold chamber 10. This aromatic polyimide precursor solid residuum was one of those powders identified by the letters (A) through (W) in Table 1 above. The mold was then heated to a temperature of 140° C. for 60 minutes by means of the heat plates 11 during which time foaming occurred. Following this, the mold was rapidly transferred to a nitrogen convection oven set at 300° C., where it was held for 60 minutes to effect imidization. The mold was then cooled to room temperature, following which the resulting foam was post cured for several hours at an elevated temperature to remove all trace volatiles that might be present. The foam was then removed, being ready for use. Properties of the resulting foams are summarized in Table 2-1 and 2-2 below.

TABLE 2-1

Properties of Neat Foams

| Precursor Powder No. | Ex. | PI | Apparent Density pcf | Compression Strength psi | Tg ° C. |
|---|---|---|---|---|---|
| (A) | 1 | ODPA/3,4'ODA | 5 | 122 | 237 |
| (B) |  | ODPA/3,4'ODA | 2 | 4.9 | 237 |

TABLE 2-1-continued

Properties of Neat Foams

| Precursor Powder No. | Ex. | PI | Apparent Density pcf | Compression Strength psi | Tg ° C. |
|---|---|---|---|---|---|
| (C) |  | ODPA/3,4'ODA | 3 | 25 | 237 |
| (D) |  | ODPA/3,4'ODA | 4 | 55 | 237 |
| (E) |  | ODPA/3,4'ODA | 10 | 185 | 237 |
| (F) | 2 | ODPA/3,4'ODA | 2 | 14 | 237 |
| (G) | 3 | BTPA/3,4'ODA | 2 | 15 | 260 |
| (H) | 4 | BTPA/3,4'ODA | 2 | 15 | 261 |
| (I) | 5 | DSDA/3,4'ODA | 2 | 18 | 273 |
| (J) | 6 | PMDA/3BAPB | 2 | 17 | 250 |
| (K) | 7 | BPADA/m-PDA | 2 | 13 | 215 |
| (L) | 8 | ODPA/3,4'ODA, p-PDA (9/1) | 2 | 14 | 242 |
| (M) | 9 | BTDA/4,4'ODA | 2 | 14 | 297 |
| (N) |  | BTDA/4,4'ODA | 1 | 2 | 297 |
| (O) |  | BTDA/4,4'ODA | 3 | 21 | 297 |
| (P) |  | BTDA/4,4'ODA | 8 | 155 | 297 |
| (Q) |  | BTDA/4,4'ODA | 12 | 256 | 297 |
| (R) | 10 | BTDA/4,4'DDS | 2 | 5 | 320 |
| (S) |  | BTDA/4,4'DDS | 1 | 3 | 320 |
| (T) | 11 | BTDA/4,3BAPS | 2 | 13 | 241 |
| (U) | 12 | BPDA/3,4'ODA, APB (85/15) | 2 | 14 | 250 |
| (V) |  | BPDA/3,4'ODA, APB (85/15) | 1 | 7 | 250 |
| (W) | 13 | BTDA NA (2.1/2.0)/3,4'ODA | 2 | 24 | >350 |

TABLE 2-2

Properties of Neat Foams

| Precursor Powder No. | Ex. | PI | Limiting oxygen index | Thermal Stability (wt %) |
|---|---|---|---|---|
| (A) | 1 | ODPA/3,4'ODA | 51 | 0.6 |
| (B) | 1 | ODPA/3,4'ODA | 42 | 1.07 |
| (M) | 9 | BTDA/4,4'ODA | 49 | 0.0 |

III. Preparation of Foam-Filled Honeycomb Cores

1. Four Nomex aramide honeycomb cores, each having a thickness of 1.5 inches, overall dimensions of 12 inches by 12 inches, and honeycomb hexagonal diameters of ⅛ inches were provided having an apparent density of 3 pcf. (Compression Strength 222 psi). Each honeycomb core was entirely filled with the one of the friable balloons of (FF), (GG), (HH), (II) or (JJ), respectively. (See Table 1 above and Table 3 below.) In each case, the filled honeycomb core was held between two carbon plates and heated to 200° C. for 30 minutes to cause foaming, followed by heating at 250° C. for 90 minutes. In each case, strong adhesion between the resulting foams and the honeycomb core resulted. Basic properties of the resulting foam-filled honeycomb cores are summarized in Table 3, Example 1.

2. The procedure of Example 1 was repeated except that Korex honeycomb cores (3 pcf and Compression Strength 332 psi) were used in replacement of the Nomex aramide honeycomb cores. Basic properties of the resulting foam-filled honeycomb cores are summarized in Table 3, Example 2.

3. The procedure of Example I was repeated except that dry blends of (GG) and glass hollow-microspheres (Scotch Lite Glass-bubbles K-1) were used instead of (GG) alone. Basic properties of the resulting foam-filled honeycomb cores are summarized in Table 3, Example 3.

TABLE 3

Properties of Foam-filled Honeycomb Cores

| Example | PI | Precursor | Foam-filled Honeycomb Apparent Density Pcf | Foam-filled Honeycomb Compression Strength psi |
|---|---|---|---|---|
| 1 | ODPA/3,4'ODA | (FF) | 5.6 | 324 |
|  |  | (GG) | 6.6 | 376 |
|  | BTDA/4,4BAPS | (HH) | 6.7 | 397 |
|  | BTDA/4,4'DDS, 3,3'DDS (8/2) | (II) | 5.7 | 313 |
|  | BTDA/3,4'ODA, APB (85/15) | (JJ) | 6.9 | 405 |
| 2 | ODPA/3,4'ODA | (FF) | 5.7 | 491 |
|  |  | (GG) | 7.8 | 515 |
|  | BTDA/4,4BAPS | (HH) | 6.6 | 440 |
|  | BTDA/4,4'DDS, 3,3'DDS(8/2) | (II) | 5.7 | 480 |
|  | BTDA/3,4'ODA, APB (85/15) | (JJ) | 8.0 | 520 |
| 3 | (GG)/Glass (50/50) by weight |  | 6.9 | 237 |
|  | (GG)/Glass (75/25) by weight |  | 7.1 | 298 |

We claim:

1. A mechanically undensified foam comprising an aromatic polyimide and having the following combination of properties:
   a density according to ASTM D-3574A of from about 0.5 pounds/ft³ to about 20 pounds/ft³;
   a compression strength according to ASTM D-3574C of from about 1.5 psi to about 1500 psi; and
   a limiting oxygen index according to ASTM D-2863 of from about 35% oxygen to about 75% oxygen at atmospheric pressure;
   the foam having no appreciable solid inorganic contaminants which are residues of inorganic blowing agents.

2. The foam of claim 1, wherein the aromatic polyimide has a glass transition temperature (Tg) by differential scanning calorimetry of from about 235° C. to about 400° C.; and a thermal stability of from 0 to about 1% weight loss at 204° C. as determined by thermogravimetric analysis (TGA).

3. The foam of claim 1, wherein the aromatic polyimide has repeating units represented by formula (I):

(I)

wherein R is a tetravalent aromatic radical having 1 to 5 benzenoid-unsaturated rings of 6 carbon atoms, the four carbonyl groups being directly bonded to different carbon atoms in a benzene ring of the R radical, each pair of carbonyl groups being bonded to adjacent carbon atoms in the benzene ring of the R radical; and R' is a divalent aromatic radical having 1 to 5 benzenoid-unsaturated rings of 6 carbon atoms, the amino groups being directly bonded to different carbon atoms in a benzene ring of the R' radical.

4. The foam of claim 3, wherein the aromatic polyimide having repeating units represented by formula (I) is prepared by reacting at least one derivative of a dianhydride selected from the group consisting of ODPA; BPDA; BTDA; DSDA; PMDA and BPADA with at least one derivative of a diamine selected from the group consisting of 3,4' ODA; 4,4' ODA; APB; BPB; m-PDA; p-PDA; 3,3' DDS; 4,4' DDS; 4,4 BAPS; 4,3 BAPS; 3 BAPB; 4 BAPB and BAPP.

5. The foam of claim 4, wherein the density is from about 0.5 to about 5 pounds/ft³; the compression strength is from about 1.5 psi to about 120 psi at 10% deflection; and the limiting oxygen index is from about 35% oxygen to about 50% oxygen.

6. The foam of claim 4, wherein the density is from about 5 to about 20 pounds/ft³; the compression strength is from about 120 psi to about 620 psi at 10% deflection; and the limiting oxygen index is from about 50% oxygen to about 75% oxygen.

7. The foam of claim 4, wherein the aromatic polyimide is prepared by reacting ODPA with 3,4' ODA, and the density is from about 0.5 to about 20 pounds/ft³.

8. The foam of claim 4, wherein the aromatic polyimide is prepared by reacting BTDA and 4,4' ODA, and the density is about 2 pounds/ft³.

9. The foam of claim 4, wherein the aromatic polyimide is prepared by reacting BTDA with 4,4' DDS, and the density is about 2 pounds/ft³.

10. The foam of claim 1, wherein the aromatic polyimide is an admixture of two or more different polyimides prepared by reacting at least one derivative of a dianhydride selected from the group consisting of ODPA; BPDA; BTDA; DSDA; PMDA and BPADA with at least one derivative of a diamine selected from the group consisting of 3,4' ODA; 4,4' ODA; APB; BPB; m-PDA; p-PDA; 3,3' DDS; 4,4' DDS; 4,4 BAPS; 4,3 BAPS; 3 BAPB; 4 BAPB and BAPP.

11. The foam of claim 4, wherein the aromatic polyimide is a copolyimide.

12. An integral, composite structure comprising a receptacle filled with a foam according to claim 1.

13. An integral, composite structure according to claim 12, wherein the receptacle is a container comprising an array of open cells therein, the cells being filled with a foam according to claim 1.

14. An integral, composite structure according to claim 13, wherein the container is a honeycomb structure comprising a contiguous array of hexagonal cells of a reinforced polymeric material, which cells are filled with a foam according to claim 1.

15. A foam according to claim 1, wherein the polyimide is intimately associated with from about 1 to about 50% by weight of a filler, based on the total weight of the foam plus filler.

16. The foam of claim 15, wherein the filler is a member selected from the group consisting of glass microspheres, phenolic microspheres, ground cork, mica, glass fibers and wollastonite fibers.

17. The foam of claim 16, wherein the filler is glass microspheres in an amount sufficient to provide from about 20–35% by weight, based on the total weight of the foam plus filler.

18. A process for preparing an aromatic polyimide foam according to claim 1, which process comprises:

(1) providing an aromatic polyimide precursor solid residuum which is prepared from an admixture of an aromatic compound (A), which is an aromatic dianhydride or a derivative of an aromatic dianhydride, and an aromatic compound (B), which is an aromatic diamine or a derivative of an aromatic diamine, plus a complexing agent (C), which is complexed with the admixture by hydrogen bonding, the complexing agent (C) being present in an amount sufficient to provide from about 1 to about 15% by weight, based on the total weight of the polyimide precursor solid residuum, which is formed by heating the complexed admixture to remove excess complexing agent and volatile by-products;

(2) heating the aromatic polyimide precursor solid residuum to a temperature between about 100° C. and 200° C. to produce a foam from the aromatic polyimide precursor solid residuum;

(3) heating the foam to a temperature between about 200° C. and 300° C. to produce a thermally imidized foam; and (4) cooling the thermally imidized foam for subsequent utilization.

19. A process for preparing an aromatic polyimide foam according to claim 1, which process comprises:

(1) providing an aromatic polyimide precursor solid residuum, which is prepared from an admixture comprising an approximately equimolar mixture of an aromatic compound (A)

wherein n is an integer from 0 to 3, and $R_1$ is hydrogen or an alkyl group, and $R_2$ is a tetravalent aromatic radical having 1 to 5 benzenoid-unsaturated rings of 6 carbon atoms, $R_3$ is a divalent aromatic radical having 1 to 5 benzenoid-unsaturated rings of 6 carbon atoms, plus a compound (C), which complexes with the admixture by hydrogen bonding and which has a boiling temperature of less than 200° C., the compound (C) being present in an amount sufficient to provide from about 1 to about 15% by weight, based on the total weight of the aromatic polyimide precursor solid residuum, which is formed by heating the complexed admixture to remove excess complexing agent and volatile by-products;

(2) heating the aromatic polyimide precursor solid residuum to a temperature between about 100° C. and 200° C. to produce a foam from the aromatic polyimide precursor solid residuum;

(3) heating the foam to a temperature between about 200° C. and 300° C. to produce a thermally imidized foam; and (4) cooling the thermally imidized foam for subsequent utilization.

20. The process of claim 19, wherein the aromatic compound (A) and the aromatic compound (B) are present in an approximately equimolar admixture.

* * * * *